United States Patent
Sies et al.

(10) Patent No.: US 7,174,798 B2
(45) Date of Patent: Feb. 13, 2007

(54) ALIGNMENT DEVICE FOR POSITIONING LIQUID FLOW TUBE

(75) Inventors: Duane J. Sies, Freeport, IL (US); Richard W. Gehman, Hilliard, OH (US); Michael G. Marchini, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 126 days.

(21) Appl. No.: 10/965,328

(22) Filed: Oct. 14, 2004

(65) Prior Publication Data

US 2006/0081044 A1 Apr. 20, 2006

(51) Int. Cl.
G01F 15/18 (2006.01)
G01N 33/00 (2006.01)

(52) U.S. Cl. .................... 73/866.5; 73/201; 73/53.01; 248/49; 248/65; 248/71; 248/229.1; 248/229.26

(58) Field of Classification Search .......... 73/866.5, 73/201, 53.01; 248/49, 65, 71, 229.1, 229.26
See application file for complete search history.

(56) References Cited

U.S. PATENT DOCUMENTS

| 4,774,676 | A | * | 9/1988 | Stenzel et al. ............ 702/49 |
| 5,228,329 | A | | 7/1993 | Dennison |
| 5,659,647 | A | | 8/1997 | Kravitz et al. |
| 5,971,001 | A | * | 10/1999 | Andersson ............ 137/15.12 |
| 6,123,184 | A | | 9/2000 | Yasuda et al. |
| 6,789,328 | B2 | | 9/2004 | Beckhart et al. |
| 2002/0148632 | A1 | | 10/2002 | Kasuya |
| 2004/0184036 | A1 | | 9/2004 | Kusumoto |
| 2004/0185581 | A1 | | 9/2004 | Hwang et al. |

FOREIGN PATENT DOCUMENTS

JP 2003185522 3/2003

OTHER PUBLICATIONS

PCT-International Search Report-Date of Mailing: Feb. 28, 2006.

* cited by examiner

Primary Examiner—Daniel S. Larkin
(74) Attorney, Agent, or Firm—Luis M. Ortiz; Kermit D. Lopez

(57) ABSTRACT

A combined liquid flow tube alignment and liquid sensing system includes flow tube mounting and alignment hardware including a clip for fastening the hardware to a substrate; and a sensor for sensing integrated with the liquid flow tube mounting and alignment hardware, wherein fluid flowing through a flow tube mounted and aligned by the flow tube The flow tube mounting and alignment hardware includes a clip with internal periphery edges sized to match the external periphery edges of at least one sensing element associated with the sensor. At least two posts located at outer members of the clip above and below the tube. Posts are sized to be located ideally within a system to position and retain the outer diameter of liquid flow tube with respect to internal periphery edges of the clip and subsequently, the sensing element both horizontally and vertically. A center flexing member associated with the clip. A slot to accurately position/retain and apply a controlled force to an area of the tube located at the center of the sensing element.

19 Claims, 1 Drawing Sheet

ALIGNMENT DEVICE FOR POSITIONING LIQUID FLOW TUBE

TECHNICAL FIELD

The present invention is generally related to liquid flow sensors. More particularly, the present invention is related to a device for accurately positioning and aligning a liquid flow tube with respect to a sensor.

BACKGROUND OF THE INVENTION

Sensors, such as Surface Acoustic Wave (SAW) sensors, or thermal transfer sensors are used for many industrial and environmental applications. SAW sensors can be used to sense pressure, temperature, torque, humidity from various media such as liquid, vapor and gas. Sensors are useful for measuring/tracking fluid flow; however, the effectiveness of the fluid sensor is often dependent on its alignment along a sensor or within or a liquid flow tube with respect to an integrated sensor.

SUMMARY OF THE INVENTION

The present invention includes hardware that aligns liquid flow tubes for optional sensing and data acquisitions of fluid flowing therein through sensors which are integrated with the hardware used for aligning liquid flow tubes.

Accordingly, it is a feature of the present invention to provide a device for positioning a liquid flow tube with respect to a sensing element.

It is a feature of a preferred embodiment of the invention to provide combined liquid flow tube alignment and a liquid sensing system which includes liquid flow tube mounting and alignment hardware including a clip for fastening the hardware to a substrate including a sensor element integrated with the liquid flow tube mounting and alignment hardware. Fluid flowing through a flow tube mounted and aligned by the flow tube mounting and alignment hardware flows into the sensor element integrated with the flow tube and the liquid flow tube mounting and alignment hardware wherein the liquid is sensed by the sensing element associated with the liquid sensing system.

In accordance with another feature of the present invention, the flow tube mounting and alignment hardware position a liquid flow tube in alignment with respect to a sensor.

In accordance with yet another feature of the present invention, flow tube mounting and alignment hardware are provided that include a clip with internal periphery edges sized to match the external periphery edges of at least one sensing element associated with the sensor.

In accordance with yet another feature of the present invention, combined tube mounting and alignment hardware further comprise at least two posts located at outer members of the clip above and below the tube. The posts are sized to be located ideally within a system to position and retain the outer diameter of liquid flow tube with respect to internal periphery edges of the clip and subsequently, the sensing element both horizontally and vertically.

In accordance with yet another feature of the present invention, a center flexing member is provided in association with the clip.

In accordance with yet another feature of the present invention, a slot is included to accurately position/retain and apply a controlled force to an area of the tube located at the center of the sensing element.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
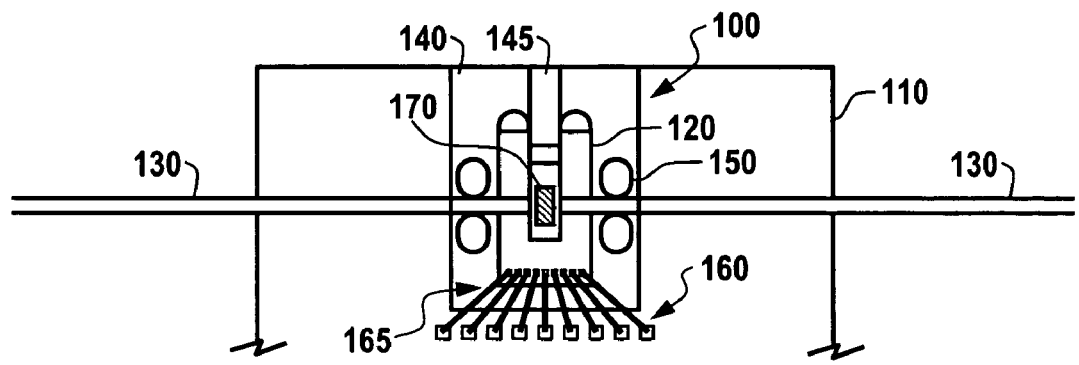
FIG. 1 illustrates a sensor and liquid flow tube alignment system in accordance with features of the present invention.

It is a main feature of the present invention to provide a device for positioning a liquid flow tube with respect to a sensing element. Referring to FIG. 1, a liquid flow tube alignment and liquid sensing system/device 100 includes a sensor base 140 for supporting the liquid flow tube alignment and sensing system hardware 100 and for securing the sensor base 140 and the liquid flow tube alignment and sensing system hardware 100 to a substrate 110 (e.g., circuit board). The liquid flow tube alignment and sensing system hardware 100 includes a clip 145. A sensing element 120 can be assembled as part of the flow tube mounting and alignment hardware 100.

At least two posts 150 can be located on each of the outer members of the clip 145 and are sized and located in a manner that will position and retain the outer diameter of liquid flow tube 130 in alignment with respect to the internal periphery edges of the clip 145 and subsequently, the sensing element 120, both horizontally and vertically. A center flexing member of the flow tube mounting and alignment hardware 100 can also have a slot 170 formed therein, wherein the slot 170 can accurately position/retain and apply a controlled force to the tube at the center of the sensing element 120.

The slot can also provide for ventilation/heat dissipation from the area around the sensing element 120. The liquid flow tube alignment and liquid sensing system/device 100 includes wire bond pads 165 that are positioned in close proximity to the substrate's wire bond pads 160. Wire bonding between the pads on the substrate and the sensing element completes the electrical connection.

Figure 2:
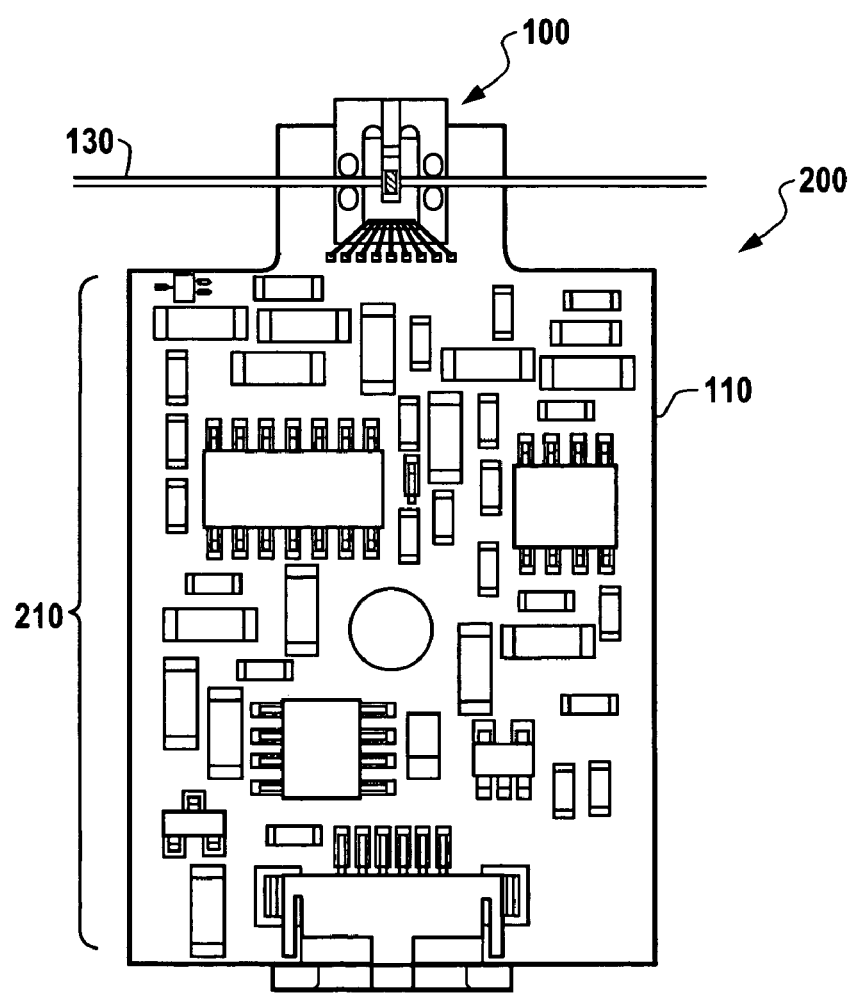
FIG. 2 illustrates a circuit board and components integrating a sensor and liquid flow tube alignment system of FIG. 1 as a component on the circuit board.

Referring to FIG. 2, the liquid flow tube alignment and liquid sensing system/device 100 can be located on a substrate 110, e.g., a circuit board 200 containing associate system components 210 (e.g., electronic circuitry and modules), via a printed fiduciary on the substrate 110.

The liquid flow tube alignment and liquid sensing system/device 100 can be affixed to the substrate 110 with an adhesive. A liquid flow tube 130 is inserted into the liquid flow tube alignment and liquid sensing system/device 100 via the clip 145. The clip 145 is then positioned around the sensing element 120 and bonded into place. The clip 145 can be initially open-ended in this insertion area to allow access to the flow tube for the initial assembly and operation.

Limited contact area between liquid flow tube 130 and clip 145 can decrease heat dissipation to the liquid being sensed. The flexible center member of the clip 145 can be designed to hold the tube 130 in contact with the sensing element 120. The preferred embodiment has the flex member and slot 170 formed directly over the sensing element 120 on the clip 145. An alternate embodiment for the thermal sensor has two contact points 150 on the flex member, adjacent either side of the sensing element 120 to reduce heat transfer(e.g., heat sinks).

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A combined liquid flow tube alignment and liquid sensing system, comprising:
    flow tube mounting and alignment hardware including a clip for fastening the hardware to a substrate; and
    a sensing element integrated with the liquid flow tube mounting and alignment hardware, wherein liquid flowing through a flow tube mounted and aligned by the flow tube mounting and alignment hardware flows into the sensing element integrated with the flow tube and the flow tube mounting and alignment hardware and is sensed by the sensing element.

2. The system of claim 1 wherein the sensing element produces data after the liquid is sensed.

3. The system of claim 1 wherein the flow tube mounting and alignment hardware position the liquid flow tube in alignment with respect to the sensing element.

4. The system of claim 1 wherein the flow tube mounting and alignment hardware includes a clip with internal periphery edges sized to match external periphery edges or corners of the sensing element.

5. The system of claim 1 further comprising at least two posts located at outer members of the clip above and below the liquid flow tube, wherein the posts are sized to be located ideally within the system to position and retain the outer diameter of the liquid flow tube with respect to internal periphery edges of the clip.

6. The system of claim 5 including a center flexing member associated with the clip.

7. The system of claim 6 further including a slot formed within the liquid flow tube mounting and alignment hardware to accurately apply and retain a controlled force to an area of the liquid flow tube located at the center of the sensing element.

8. A combined liquid flow tube alignment and liquid sensing system, comprising:
    liquid flow tube mounting and alignment hardware including a clip for fastening the liquid flow tube mounting and alignment hardware to a substrate and having internal periphery edges or corners sized to match external periphery edges of a sensing element associated with the sensor; and
    a sensing element integrated with the liquid flow tube mounting and alignment hardware, wherein liquid flowing through a liquid flow tube mounted and aligned by the liquid flow tube mounting and alignment hardware flows into the sensing element integrated with the liquid flow tube and the liquid flow tube mounting and alignment hardware and is sensed by the sensing element.

9. The system of claim 8 wherein the liquid flow tube mounting and alignment hardware positions the liquid flow tube in alignment with respect to the sensing element.

10. The system of claim 8 further comprising at least two posts located at outer members of the clip above and below the liquid flow tube.

11. The system of claim 10 wherein the posts are sized to be located ideally within the system to position and retain the outer diameter of the liquid flow tube with respect to the internal periphery edges of the clip and subsequently, the sensing element both horizontally and vertically.

12. The system of claim 8 including a center flexing member associated with the clip.

13. The system of claim 8 further including a slot to accurately apply and retain a controlled force to an area of the liquid flow tube located at the center of the sensing element.

14. The system of claim 8 wherein the sensor produces data after the liquid is sensed.

15. A liquid flow tube alignment and liquid sensing system, comprising:
    liquid flow tube mounting and alignment hardware including a clip for fastening the liquid flow tube mounting and alignment hardware to a substrate and having internal periphery edges sized to match the external periphery edges of a sensing element associated with the liquid flow tube mounting and alignment hardware and at least two posts located at outer members of the clip above and below a liquid flow tube held onto the system by the liquid flow tube mounting and alignment hardware and the clip; and
    a sensing element integrated with the liquid flow tube mounting and alignment hardware, wherein the liquid flow tube mounting and alignment hardware positions the liquid flow tube in alignment with respect to the sensing element and wherein liquid flowing through the liquid flow tube mounted and aligned by the liquid flow tube mounting and alignment hardware flows into the sensing element and is sensed by the sensing element.

16. The system of claim 15 wherein the at least two posts are sized to be located ideally within the system to position and retain the outer diameter of the liquid flow tube with respect to the internal periphery edges of the clip and subsequently, the sensing element both horizontally and vertically.

17. The system of claim 15 including a center flexing member associated with the clip.

18. The system of claim 15 further including a slot to accurately apply and retain a controlled force to an area of the liquid flow tube located at the center of the sensing element.

19. The system of claim 15 wherein the sensing element produces data after the liquid is sensed by the sensing element.

* * * * *